(12) United States Patent
Diaz

(10) Patent No.: US 8,500,167 B2
(45) Date of Patent: Aug. 6, 2013

(54) TRAILER HAVING SECONDARY WHEEL ATTACHED TO ADJUSTABLE LEG

(76) Inventor: Marcos Angel Diaz, Woodbridge (CA)

( * ) Notice: Subject to any disclaimer, the term of this patent is extended or adjusted under 35 U.S.C. 154(b) by 0 days.

(21) Appl. No.: 13/382,614

(22) PCT Filed: Jul. 7, 2010

(86) PCT No.: PCT/CA2010/001050
§ 371 (c)(1),
(2), (4) Date: Jan. 6, 2012

(87) PCT Pub. No.: WO2011/003188
PCT Pub. Date: Jan. 13, 2011

(65) Prior Publication Data
US 2012/0098243 A1    Apr. 26, 2012

(30) Foreign Application Priority Data

Jul. 7, 2009   (MX) .................. MX/A/2009/007324
Aug. 26, 2009  (MX) .................. MX/A/2009/009091
Nov. 23, 2009  (MX) .................. MX/A/2009/012636

(51) Int. Cl.
*B60S 9/02* (2006.01)

(52) U.S. Cl.
USPC .................. 280/766.1; 280/763.1; 280/764.1; 254/419; 254/418

(58) Field of Classification Search
USPC ............... 280/766.1, 767, 755, 763.1, 764.1, 280/765.1, 762; 254/423, 418, 420, 116, 254/118, 119, 412, 425, 427
See application file for complete search history.

(56) References Cited

U.S. PATENT DOCUMENTS

| | | | |
|---|---|---|---|
| 2,381,842 A * | 8/1945 | Schwend | 244/103 S |
| 3,125,352 A | 3/1964 | Gouin | |
| 3,253,839 A | 5/1966 | Warren | |
| 3,397,898 A | 8/1968 | Denney et al. | |
| 3,618,969 A | 11/1971 | Glassmeyer | |
| 3,802,716 A | 4/1974 | Wiers | |
| 3,826,322 A * | 7/1974 | Williams | 180/202 |
| 3,874,696 A | 4/1975 | Gardner et al. | |
| 3,877,715 A * | 4/1975 | Thayer et al. | 280/81.6 |
| 4,605,086 A * | 8/1986 | Marom | 180/202 |
| 5,125,679 A | 6/1992 | Delano | |
| 5,137,296 A | 8/1992 | Forman | |
| 5,346,233 A | 9/1994 | Moser | |
| 5,460,397 A | 10/1995 | Shielman | |
| 5,863,057 A | 1/1999 | Wessels | |
| 6,176,458 B1 * | 1/2001 | Stryke | 248/351 |
| 6,225,894 B1 | 5/2001 | Kyrtsos | |

(Continued)

*Primary Examiner* — John Walters
*Assistant Examiner* — James Triggs
(74) *Attorney, Agent, or Firm* — Husch Blackwell, LLP

(57) ABSTRACT

A trailer has a body, a primary wheel, and an adjustable leg for providing secondary support. The leg has a terminal end moveable between retracted and extended positions and a secondary wheel rotatably attached to the terminal end, such that the secondary wheel is off the ground when the terminal end is in the retracted position and is in contact with the ground when the terminal end is in the extended position. A pneumatic or hydraulic drive unit is mounted on the trailer body for adjusting the leg to move the terminal end between the extended and retracted positions. A drivetrain is mounted on the trailer body and operatively connected to the secondary wheel for driving the secondary wheel. A controller controls operation of the drive unit to automatically adjust the leg to maintain balance of the trailer, and controls operation of the drivetrain to drive the trailer.

16 Claims, 9 Drawing Sheets

U.S. PATENT DOCUMENTS

| | | |
|---|---|---|
| 6,588,799 B1 | 7/2003 | Sanchez |
| 6,592,230 B2 * | 7/2003 | Dupay .......................... 359/839 |
| 6,668,225 B2 | 12/2003 | Oh et al. |
| 7,611,160 B1 * | 11/2009 | Ignacio ......................... 280/475 |
| 2006/0042841 A1 | 3/2006 | Russell |
| 2006/0119089 A1 | 6/2006 | Rivers et al. |

* cited by examiner

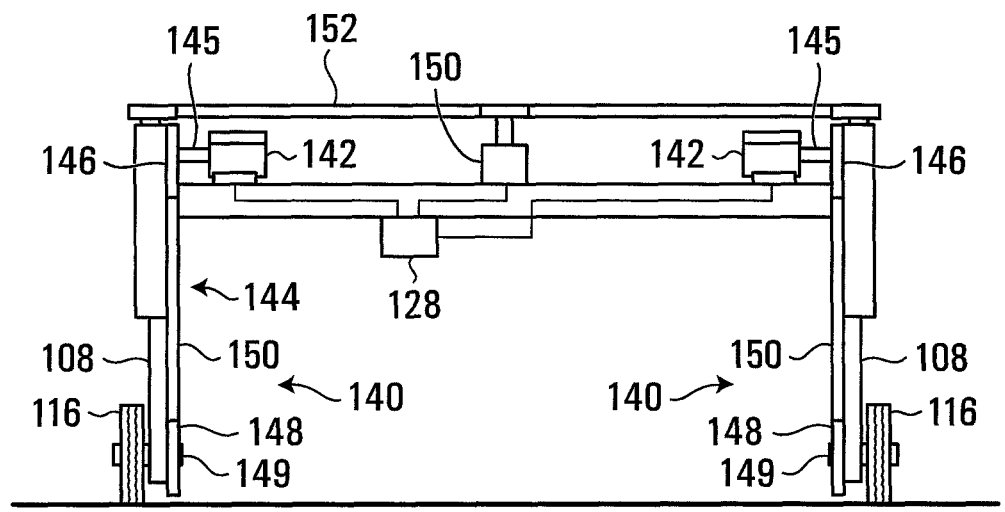
FIG. 9
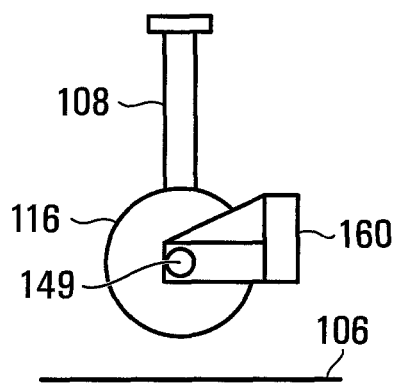 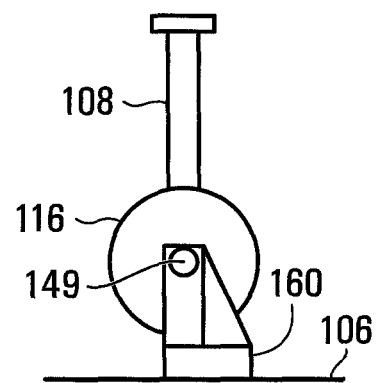
FIG. 10      FIG. 11

TRAILER HAVING SECONDARY WHEEL ATTACHED TO ADJUSTABLE LEG

CROSS REFERENCE TO RELATED APPLICATIONS

This application is a national filing of International Application No. PCT/CA2010/001050, filed on Jul. 7, 2010, entitled "TRAILER HAVING SECONDARY WHEEL ATTACHED TO ADJUSTABLE LEG", the entire contents of which are incorporated herein by reference. The International Application No. PCT/CA2010/001050 claims the priority and benefit of Mexican patent application serial No. MX/a/2009/007324 (MX/E/2009/042188), filed Jul. 7, 2009, the entire contents of which are incorporated herein by reference.

The International Application No. PCT/CA2010/001050 also claims the priority and benefit of Mexican patent application serial No. MX/a/2009/009091 (MX/E/2009/054956), filed Aug. 26, 2009, the entire contents of which are incorporated herein by reference.

The International Application No. PCT/CA2010/001050 further claims the priority and benefit of Mexican patent application serial No. MX/a/2009/012636 (MX/E/2009/074715), filed Nov. 23, 2009, the entire contents of which are incorporated herein by reference.

FIELD OF THE INVENTION

The present invention relates generally to trailers, and particularly to trailers with adjustable support legs.

BACKGROUND OF THE INVENTION

A trailer towed by a powered vehicle such as a truck, tractor, car, or the like, can become unstable or unbalanced when it is standing or moving on an inclined or uneven ground surface, or when it is changing the direction of travel, which may result in displacement of the goods carried on the trailer, or even toppling of the trailer.

Some trailer stabilization systems have been developed to stabilize trailers (see, e.g., U.S. Pat. No. 6,176,458 to Stryke, issued Jan. 23, 2001).

SUMMARY OF THE INVENTION

However, it has been realized that a trailer with an improved stabilizing system is desirable.

In accordance with an aspect of the present invention, there is provided a trailer comprising a trailer body; a primary wheel mounted under the trailer body and in contact with the ground for supporting the trailer and allowing the trailer to be towed; an adjustable leg attached to the trailer body for providing secondary support of the trailer, the leg comprising a terminal end moveable between a retracted position and an extended position, and a secondary wheel rotatably attached to the terminal end of the leg such that the secondary wheel is off the ground when the terminal end is in the retracted position and is in contact with the ground when the terminal end is in the extended position; a pneumatic or hydraulic drive unit mounted on the trailer body for adjusting the leg to move the terminal end of the leg between the extended and retracted positions; a drivetrain mounted on the trailer body and operatively connected to the secondary wheel for driving the secondary wheel; a controller for controlling operation of the pneumatic or hydraulic drive unit to automatically adjust the leg to maintain balance of the trailer, and for controlling operation of the drivetrain to drive the trailer when the secondary wheel is in contact with the ground.

The pneumatic or hydraulic drive unit may comprise a pneumatic or hydraulic cylinder, and a pneumatic or hydraulic generator for driving the cylinder. The leg may comprise the cylinder and the terminal end of the leg is extendable downwards from the retracted position. The leg may be rotatably attached to the trailer body, and the cylinder may be attached to the trailer body and the leg to rotate the leg so as to move the terminal end of the leg between the retracted position and the extended position. The cylinder may be a pneumatic cylinder and the generator may comprise a compressor. A foot may be mounted at the terminal end of the leg, the foot having a generally flat bottom surface and being movable between a raised position and a lowered position, wherein when the foot is in the raised position the secondary wheel is allowed to contact the ground to support the trailer, and when the foot is in the lowered position the bottom surface of the foot contacts the ground to support the trailer. The foot may comprise a generally U- or L-shaped body. The trailer may comprise a locking mechanism for selectively locking the foot in one of the raised and lowered positions. The controller may comprise a sensor for sensing a degree of tilting of the trailer body. The controller may comprise a remote control for operating the controller. The drivetrain may comprise a pneumatic engine. The drivetrain may comprise a chain drive for transmitting a rotational torque from the engine to the secondary wheel. The trailer may comprise an airbag mounted under the trailer body above the primary wheel, a roller frame attached to the airbag and a roller rotatably supported on the roller frame, such that when the airbag is depleted the roller is spaced away from the primary wheel, and when the airbag is expanded the roller contacts the primary wheel to provide addition support for the trailer body. The trailer may comprise an air suspension, the air suspension comprising at least two air springs, an air supply connected to each air spring for independently supplying or withdrawing air from each air spring, and a controller for controlling independent supply and withdrawal of air from each air spring in response to titling of the trailer body. The trailer may comprise a plurality of primary wheels. The trailer may comprise a plurality of adjustable legs and a plurality of secondary wheels each rotatably mounted on a terminal end of one of the legs.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

FIG. 9 is a front elevation view of another trailer, exemplary of an embodiment of the present invention;

FIG. 10 is a side elevation view of a leg for the trailer of FIG. 1 with a foot mounted on the leg in a raised position;

FIG. 11 is a side elevation view of the leg and foot of FIG. 10, with the foot in a lowered position;

DETAILED DESCRIPTION

Figure 1:
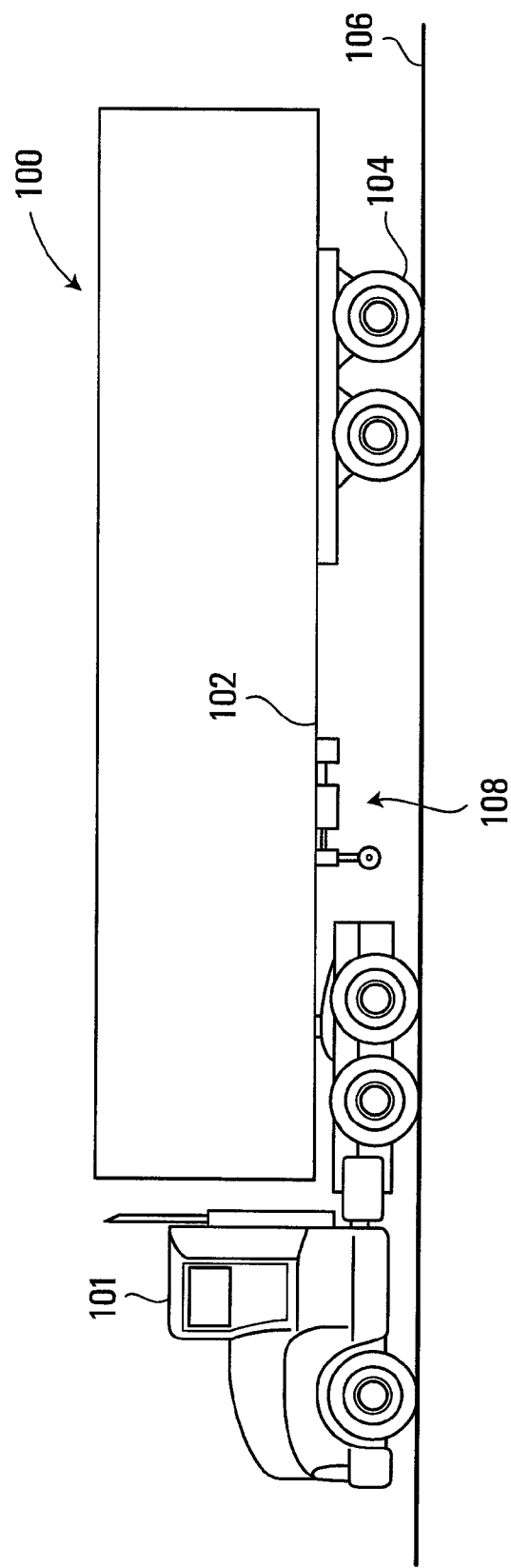
FIG. 1 is a side elevation view of a truck with a cab and a trailer, exemplary of an embodiment of the present invention.
Figure 2:
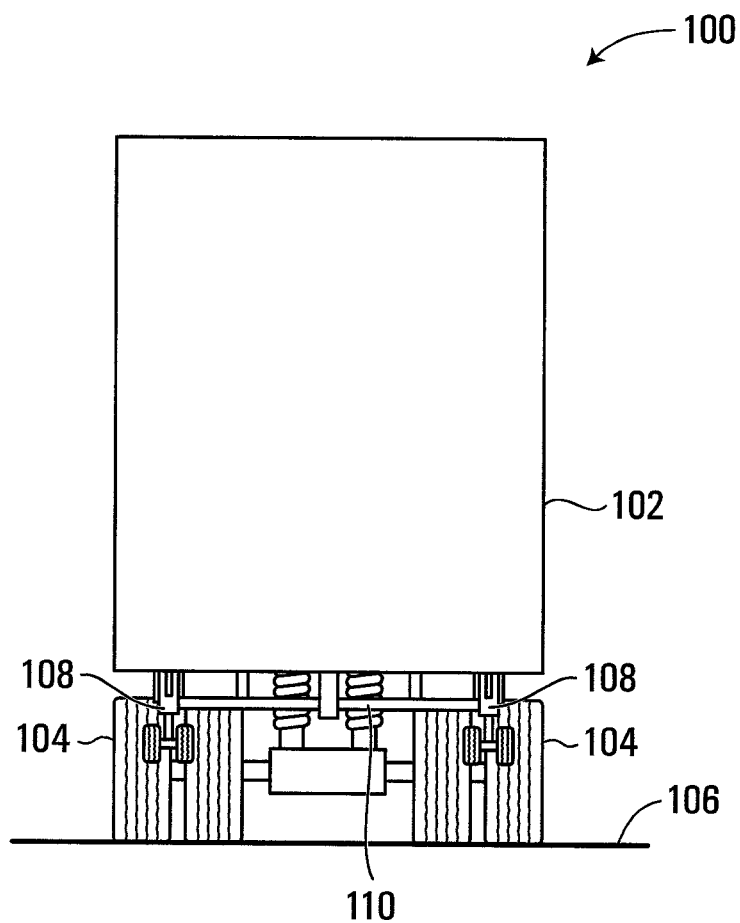
FIG. 2 is a front elevation view of the trailer of FIG. 1.

FIGS. 1 and 2 depict a trailer 100, exemplary of an embodiment of the present invention. As depicted, during normal use trailer 100 is towed by a cab 101 or another powered vehicle, which may be detachable from trailer 100. The trailer structures depicted in the figures are shown for illustration purposes, and trailer 100 may have a structure or construction different from that shown in the figures. Broadly, a trailer refers to any transport vehicle or structure that is configured to be towed or hauled by a powered vehicle such as an automobile or an automated vehicle. A trailer may include a tractor trailer, a truck cargo container, a cargo container that is configured to be towed, a frame structure for supporting a cargo container and being configured to be towed, or the like.

In the embodiment depicted in FIGS. 1 and 2, trailer 100 has a trailer body 102, and four primary wheels 104 mounted under trailer body 102 and in contact with the ground 106 for supporting trailer body 102. While four primary wheels are depicted in FIG. 2, in different embodiments, the number of primary wheels may vary depending on the particular purpose for which the trailer is to be used. For example, some trailers may have two primary wheels, and other trailers may have three, six, or more than ten primary wheels. A primary wheel is constructed to provide primary support for the trailer.

Trailer 100 also includes one or more adjustable legs 108 for providing secondary support to trailer body 102. As depicted in FIG. 2, two legs 108 are shown. However, in different embodiments, more support legs may be used depending on the particular application. The support legs may be positioned to increase the effectiveness of the legs. As shown in FIG. 2, two legs may be provided with one leg positioned near each side of trailer body 102. Optionally, the two legs may be connected by a cross beam 110 to provide increased structural strength and stability.

Figure 3:
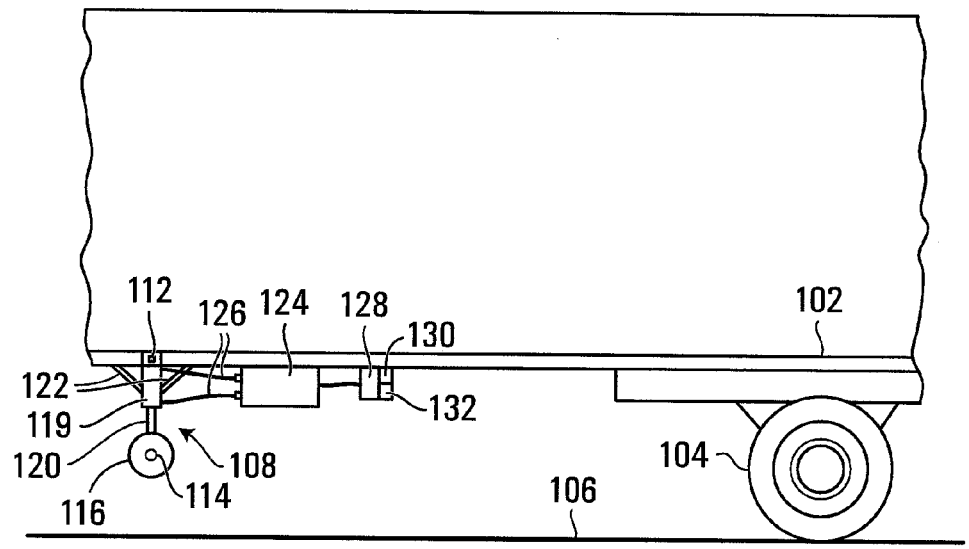
FIG. 3 is a partial enlarged side elevation view of the trailer of FIG. 1, with the support leg in a retracted position.
Figure 4:
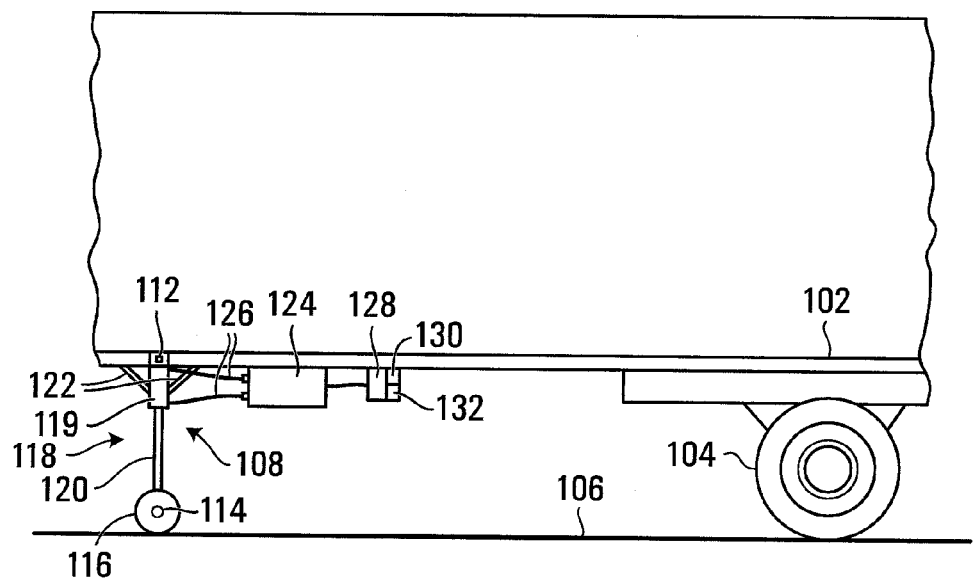
FIG. 4 is a partial enlarged side elevation view of the trailer of FIG. 1, with the support leg in an extended position.

As better shown in FIGS. 3 and 4, in one embodiment, one end (the proximal end 112) of each leg 108 is attached to trailer body 102 and the other end (terminal end 114) extends downward towards the ground 106. A secondary wheel 116 is rotatably mounted on the terminal end 114 of each leg 108.

A pneumatic or hydraulic drive unit is mounted on trailer body 102 to independently and automatically adjust each leg 108 to move its terminal end 114 between a retracted position and an extended position. The pneumatic or hydraulic drive unit may include a pneumatic or hydraulic cylinder and a pneumatic or hydraulic generator for driving the cylinder. The cylinder may be configured and mounted in any suitable manner to adjust the position/length of a leg 108.

For example, in a particular embodiment, as illustrated in FIGS. 3 and 4, each leg 108 may include a pneumatic cylinder 118, which has a tubular section 119 and a piston 120. To provide increased structural strength and stability, two rigid reinforcement bars 122 may be provided for reinforcing each leg 108. One end of each bar 122 is attached to trailer body 102 and the other end of each bar 122 is attached to the leg 108, thus providing a stable triangular structure at the proximal end of leg 108.

Cylinder 118 may be a dual acting cylinder and is connected to a compressor 124 through conduits 126. As can be appreciated, a pneumatic pressure can be applied to piston 120 by compressor 126 through conduits 126 to move piston 120 downward or upward, thus extending or retracting the terminal end 114 of leg 108. The operation of compressor 124 and the pressure applied to piston 120 can be controlled by a controller 128. As can be appreciated, a pneumatic cylinder may be replaced with a hydraulic cylinder, in which case, the compressor may be replaced with a hydraulic pump and a fluid tank.

As piston 120 moves up or down, terminal end 114 of leg 108 is retracted or extended between a retracted position (see FIG. 3) and an extended position (see FIG. 4).

As shown in FIG. 3, when leg 108 is retracted into the retracted position, secondary wheel 116 attached to the leg 108 is not in contact with the ground 106. As shown in FIG. 4, when a leg 108 is extended into the extended position, secondary wheel 116 is in contact with the ground 106 to provide additional support for trailer 100.

Figure 5:
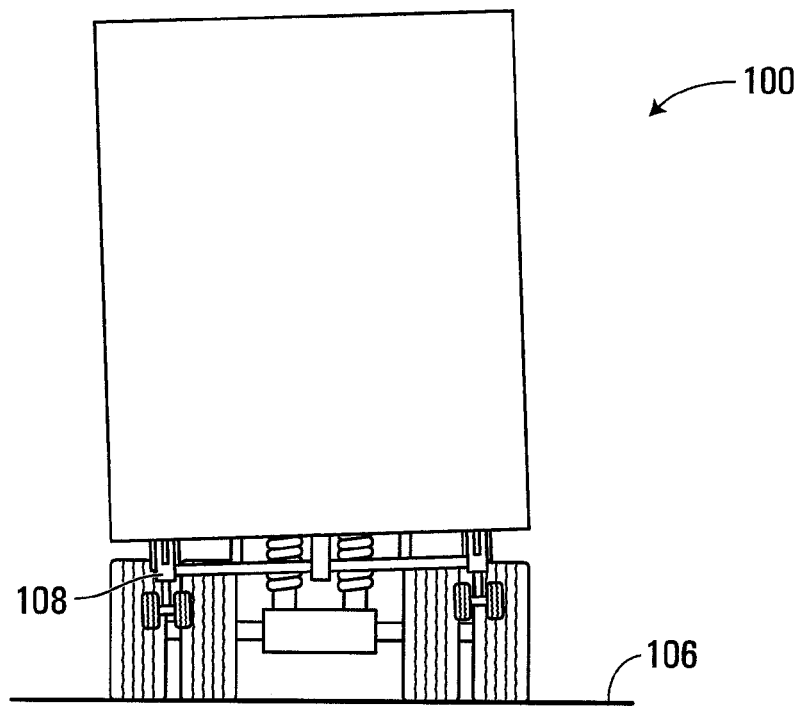
FIGS. 5 and 6 are front elevation views of the trailer of FIG. 1 during use.
Figure 6:
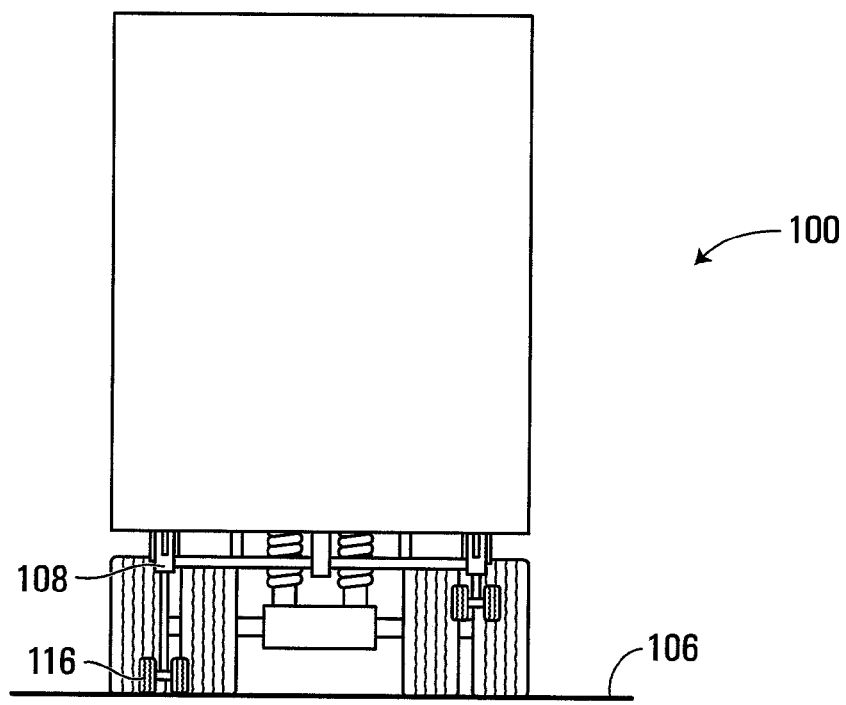

Conveniently, legs 108 may be retracted when trailer 100 is standing or moving (being towed) on a flat, level surface such that no additional support or balancing is needed. However, when trailer 100 is moving on a bumpy, uneven, or inclined ground surface, or when it is changing travel direction, trailer 100 may tip towards one side or the other, as depicted in FIG. 5. Depending on the degree of tilting, trailer 100 may become unbalanced and may tend to tip over to one side. In such situations, the leg 108 on the lower side may be extended to provide additional support to trailer 100 and to maintain balance of trailer 100, as depicted in FIG. 6.

In a sense, legs 108 can function as an automatic mechanical jack. Conveniently, when legs 108 contact the ground through rotatable secondary wheels 116, legs 108 can function even when trailer 100 is moving or being towed at normal traveling speed. Each leg 108 may be constructed to withstand a load of about 12 to 15 tons.

Controller 128 may include a processor 130 in communication with one or more sensors 132. A sensor 132 may be any suitable sensor for detecting a signal that will indicate titling of trailer body 102. For example, a liquid level sensor may be used. Processor 130 is adapted to receive and process detected signal from sensor 132 and to determine based on the received signal whether trailer body 102 requires secondary support to maintain balance. When secondary support is required or desirable, processor 130 causes actuation of legs 108 to extend to the extended position. Processor 130 may also be configured to calculate the desired or optimal position of the terminal end 114 for maintain balance of trailer body 102, and controls the operation of the pneumatic or hydraulic drive system to move the leg to the desired or optimal position. For convenient operation, controller 128 may be remotely operable by a user, such as by a driver in cab 101. For this purpose, a remote control (not shown) may be provided for operating controller 128.

The liquid level sensor may be a mercury level sensor. Controller 128 (e.g. sensor 132) may be configured to generate a trigger signal when the trailer body 102 is tilted over a pre-selected degree, to activate the controller 128 and the drive unit to start extending a corresponding leg 108 to the extended position. The extended leg 108 may be maintained at the extended position to maintain the balance of the trailer 100.

In an exemplary embodiment, sensor 132 may be configured to sense the tilting angle of trailer body 102. A trigger signal will be generated by sensor 132 when the tilting angle of trailer body 102 reaches or exceeds a threshold value. Sensor 132 may include two sensing units (not separately shown) each for monitoring tilting towards one side. Alternatively, a single sensor unit may be used to produce different trigger signals indicating the direction of tilting. The controller 128 may be constructed to provide a fast (e.g. nearly instantaneous) response to tilting so that legs 108 can be extended in time to prevent over tipping.

To achieve quick response, a pneumatic cylinder may be used to extend legs 108. As pneumatic cylinders can be activated faster than hydraulic cylinders. Alternatively, an air-over-oil construction may be used, where the cylinder is oil-based but the activation of the cylinder is driven by compressed air. For example, controller 128 may control the operation of an activation valve which regulates the air pressure applied to the oil tank that supplies oil to cylinder 118. When the valve is opened, compressed air is applied to the oil tank to push more oil into cylinder 118 to extend it.

A check valve (not separately shown) may be provided on cylinder 118 which may be closed upon piston 120 reaching the extended position or resistance by the ground. Once the check valve is closed, cylinder 118 is locked in position.

In a particular embodiment, cylinder 118 may be provided with a relief valve that will hold pressure at about 3000 psi, thus allowing cylinder 118 to be able to carry a maximum load of about 29 tons.

Upon decreasing of the load (or pressure) on cylinder 118 as a result of the trailer body 102 regaining its balance, the internal pressure in cylinder 118 may be released through the relief valve. A return valve (not shown) may also be provided to retract cylinder 118 back to the retracted or rest position.

In an exemplary embodiment, cylinder 118 may be a 5 inch double action hydraulic cylinder with an 8 inch bore diameter. The fluid for driving the cylinder may be provided by an air over oil tank (not shown). The tank and the cylinders may be connected through control valves, relief valves, return valves (not shown). Exhausts and connecting conduits (e.g. pipes or tubing) and fittings (not shown) can be provided as will be understood by those skilled in the art.

For better control, each leg 108 may be adjusted independently and automatically by controller 128.

To achieve good stabilizing performance, the operation of legs 108 should be sufficiently fast. For example, in some embodiments, the time required from sensing an imbalance of trailer body 102 to fully extending a leg 108 from the retracted position to the extended position may be less than two seconds or less than one second.

During use, legs 108 may be initially retracted by applying appropriate pneumatic pressure in cylinder 118, as shown in FIGS. 1, 3 and 5. Trailer 100 may be operated as a normal trailer when traveling except that when trailer 100 is traveling on a bumpy, uneven, or inclined ground surface, the legs 108 and secondary wheels 116 may be used to balance the trailer 100.

For example, if trailer 100 becomes tilted to one side or the other, as illustrated in FIG. 5, such as due to road conditions, one or more legs 108 can be extended to stabilize trailer 100, as illustrated in FIG. 6. When processor 130 determines that sensor 132 has detected a condition that indicates that trailer 100 is tilting to one side, controller 128 may cause a selected pressure be applied from compressor 124 to an appropriate cylinder 118 to push its piston 120 outward to extend the length of the corresponding leg 108, and move its terminal end 114 downward towards the ground 106. Eventually, secondary wheel 116 contacts the ground 106 and is resisted by the ground 106 from further downward movement. As leg 108 is further extended, the side of trailer 100 where the leg 108 is located is raised upwards, thus reducing the tilt of trailer 100. Leg 108 may be extended fully to the extended position and maintained in that position to. The pressure in cylinder 118 may be maintained at a constant level to maintain leg 108 in position and thus stabilizing trailer body 102. The other leg 108 may remain in the retracted position.

If the trailer 100 becomes tipping towards the other side, the pressure in cylinders 118 may be readjusted to extend the leg 108 on the other side and to retract the leg on this side.

When trailer 100 is traveling on a level ground surface, a heavier load may be applied to the primary wheels 104 on one side of trailer 100 than the other, such as when trailer 100 is changing its traveling direction, or when there are small bumps on the ground. In such cases, legs 108 on both sides of trailer body 102 may be extended to provide additional support for each side and to prevent temporary tipping of trailer body 102.

Optionally, and when a remote controller is provided, the driver may observe the road condition and trailer condition and may manually control the operation of compressor 124 and the adjustment of the extension of legs 108.

As can be readily appreciated, the above operation can be similarly performed while trailer 100 is parked, whether detached or still connected to the vehicle that tows the trailer 100. When parked, the secondary wheels 116 may be locked to prevent their rotation around their respective axes, for safety reasons. Any suitable locking mechanism may be used for this purpose.

Figure 7:
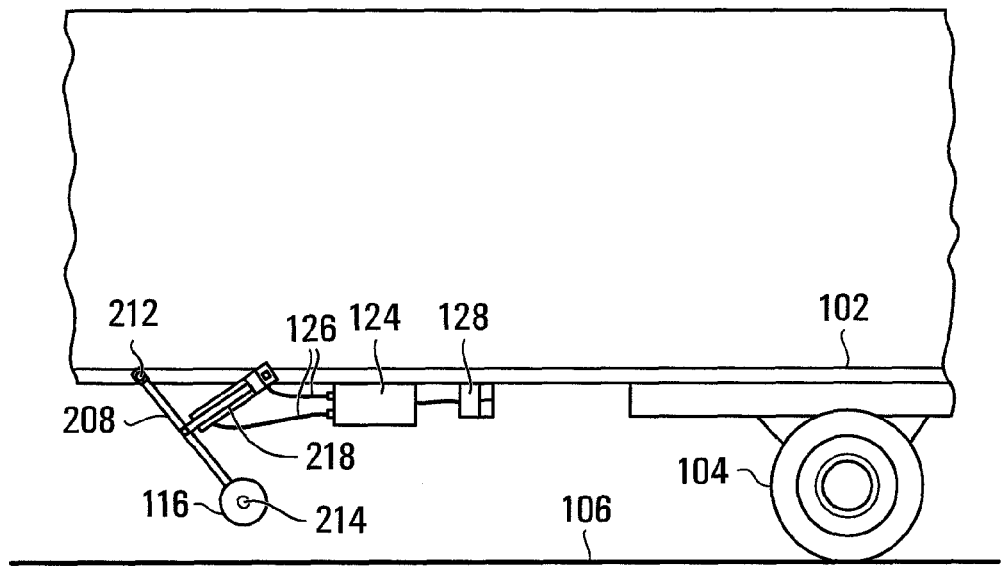
FIGS. 7 and 8 are side elevation views of another trailer, exemplary of an embodiment of the present invention.
Figure 8:
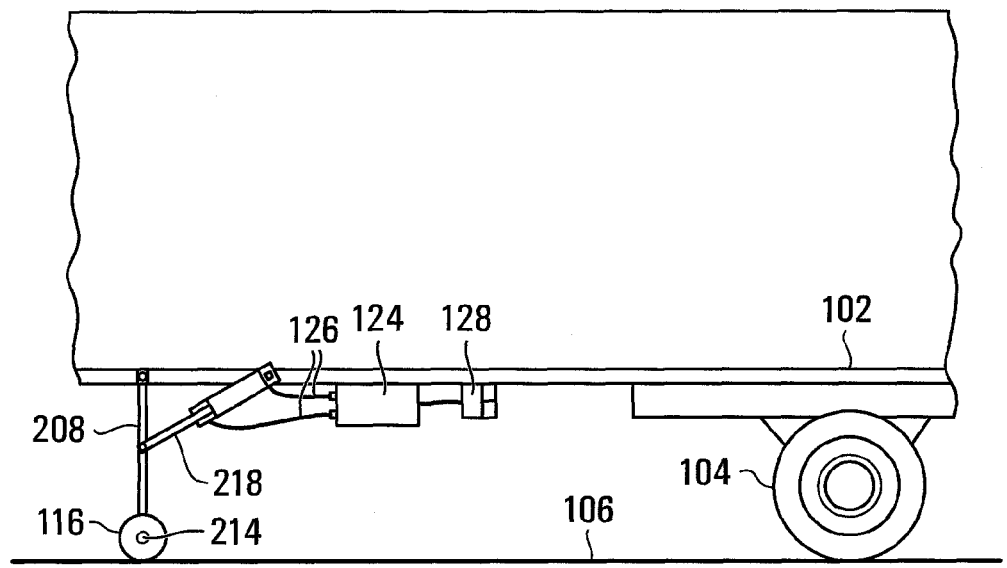

FIGS. 7 and 8 illustrate another exemplary embodiment of the support legs and the pneumatic or hydraulic drive system. As depicted, in this embodiment, a leg 208 has a fixed length and the proximal end 212 of leg 208 is rotatably attached to trailer body 102. A secondary wheel 116 is rotatably attached to the terminal end 214 of leg 208. A cylinder 218 is also provided. However, in this case, cylinder 218 does not form part of leg 208. Rather, one end of cylinder 218 is rotatably attached to trailer body 202, and the other end of cylinder 218 is rotatably attached to a mid-section of leg 208, so that extension and retraction of cylinder 218 causes leg 208 to rotate between a retracted position (where secondary wheel 116 is not in contact with the ground; as shown in FIG. 7) and an extended position (where secondary wheel 116 is in contact with the ground, as shown in FIG. 8).

In exemplary embodiments of the present invention, a drivetrain 140 is also provided to drive secondary wheels 116 and thus trailer 100, as illustrated in FIG. 9. Any suitable drivetrain construction may be used. For example, as depicted in FIG. 9, drivetrain 140 may include an engine 142 and a chain drive 144 for transmitting power from engine 142 to secondary wheels 116. Engine 142 may have an engine shaft 145 with a first gearwheel 146 mounted thereon. A second gearwheel 148 may be mounted on the rotational axle 149 of the secondary wheel 116. A chain 150 may be provided to connect the first and second gearwheels 146, 148 for transmitting torque from the first gearwheel 146 to the second gearwheel 148, and for rotating secondary wheels 116.

The drivetrain 140 or a portion thereof (such as chain drive 144) may be disengageable from secondary wheels 116 when leg 108 is in the retracted position. Alternatively, chain drive 144 may be constructed to move with terminal end and axis 149 when leg 108 is retracted or extended.

Engine 142 may be any suitable engine with sufficient power to drive trailer 100. For example, engine 142 may be a pneumatic or hydraulic engine, or may be an electrical or combustion engine. When a pneumatic or hydraulic engine is used, the generator for driving the pneumatic or hydraulic cylinder 118 or 218 may also be utilized for operating the drivetrain 140. The drivetrain 140 may be configured so that rotation of different secondary wheels 116 are coordinated or synchronized. For convenient control, multiple pneumatic or hydraulic generators may be provided.

Controller 128 may be configured to control the operation of drivetrain 140. Controller 128 may include separate subunits or different controllers (not separately shown) for controlling the adjustment of legs 108 and operation of drivetrain 140.

A leg 108 may also be configured and mounted so that it is rotatable about its longitudinal axis, so that the travel direction of secondary wheel 116 attached thereto is adjustable by rotating leg 108 about the longitudinal axis. Rotation of leg 108 may be controlled and driven by a motor 150, through a transmission system 152. One motor may be used, with a suitable transmission system, to control rotation of all legs 108 so that they are rotated in synchronization. Secondary wheels 116 can thus be conveniently steered to move trailer 100 into a desired position.

With its own drivetrain 140 and secondary wheels 116, trailer 100 may be conveniently moved or repositioned without relying on the power from cab 101. With a remote control, a user may control movement of trailer 100 from a remote location. For instance, the user may conveniently move the trailer body 102 using controller 128 either from inside cab 101, or from another location outside.

In a further embodiment, trailer 100 may include a foot 160 mounted at the terminal end 114 of each leg 108, as illustrated in FIG. 10. Foot 160 is moveably mounted to move between a raised position and a lowered position. In one embodiment, as depicted in FIG. 11, foot 160 may be rotatably mounted so that it can rotate between the raised position and the lowered position. In the raised position, the secondary wheel 116 is allowed to contact the ground to support the trailer 100, and in the lowered position foot 160 contacts the ground to support trailer 100. Foot 160 has a generally flat bottom surface which is in contact with the ground in the lowered position to provide more stable and solid support. Foot 160 may be useful when trailer 100 is parked, to provide more permanent and more stable support, as compared to the support provided by secondary wheels 116.

Figure 12:
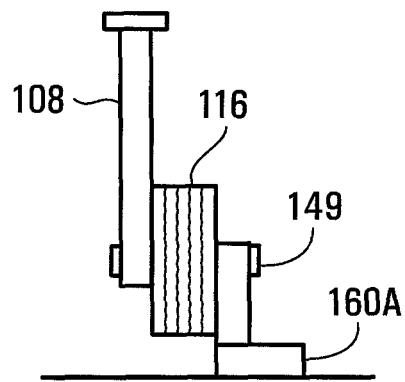
FIG. 12 is a front elevation view of the leg and foot of FIG. 11.
Figure 13:
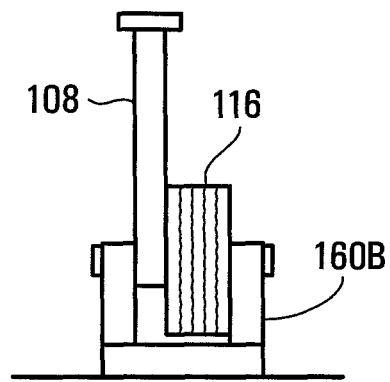
FIG. 13 is a front elevation view of the leg with a variation of the foot of FIG. 11.
Figure 14:
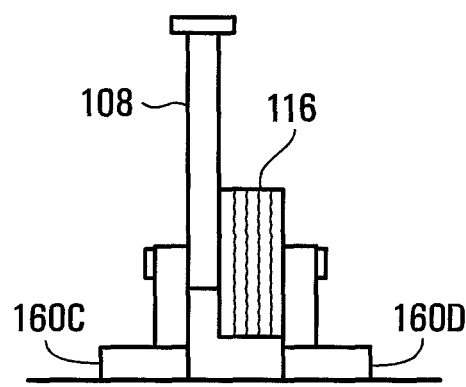
FIG. 14 is a front elevation view of the leg with another variation of the foot of FIG. 11.

Foot 160 may have a generally L-shape, as illustrated by foot 160A in FIG. 12, or generally U-shape as illustrated by foot 160B in FIG. 13. Optionally, a foot may include two L-shaped parts, as illustrated by foot parts 160C, 160D in FIG. 14.

A locking mechanism (not separately shown) may be provided for selectively locking foot 160 in one of the raised and lowered positions. A locking pin (not shown), for example, may be used, and may be provided on either foot 160 or leg 108. A corresponding pin hole (not shown) may be provided on leg 108 or foot 160 for receiving the locking pin, as can be understood by those skilled in the art.

Foot 160 may be conveniently used to avoid applying large load on the secondary wheels 116 for extended periods of time. Overloading the secondary wheels 116 for a long period of time may reduce the lifetime of the secondary wheels. Applying large load on a stationary secondary wheel may also cause the secondary wheel to sink into the ground if the ground is too soft, because the contact area between the wheel and the ground is relatively small.

Optionally, a video system (not shown) may be installed in cab 101 or trailer body 102 to allow the driver to observe the condition or movement of trailer 100.

The various connections or fixtures between the various parts described herein may be made through any suitable fixture mechanisms or structures know to those skilled in the art. For example, bolts or pins may be used. Brackets may also be used. Joints of two parts may also be soldered or welded.

As can be appreciated, legs 108, 208 and one or more other components described herein may be mounted on a cargo container itself or the chassis or a frame that supports the cargo container. The cargo container may be detachably mounted on the chassis or the frame. The trailer body may refer to any one or a combination of the chassis, frame, or container carried by the chassis or frame. The cargo container may be structured for carrying goods, animals, or human.

In cases where the primary wheels on the trailer are located at one end (e.g. the rear end) of the trailer, at least one leg 108, 208 is located at the other end (e.g. the front end) of the trailer, such that when the trailer is disconnected from the vehicle for towing the trailer, the leg(s) and secondary wheels at the front can be used to support and balance the trailer.

Legs 108, 208 and components of trailer 100 described herein may be detachably mounted, such as by threaded fixtures including bolts and nuts, so that they can be conveniently removed for maintenance, repair or replacement.

Figure 15:
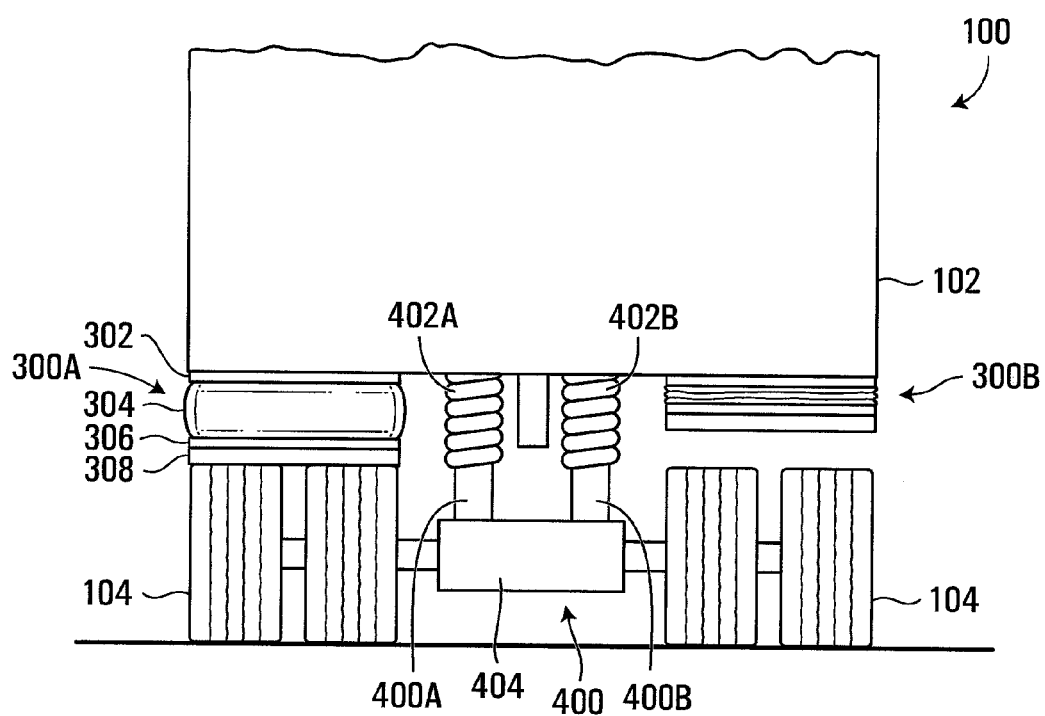
FIG. 15 is a rear elevation view of the trailer of FIG. 1, showing airbag systems and an air suspension.

In a further embodiment of the present invention, airbag systems 300A and 300B (also collectively or individually referred to as airbag system 300) may be installed between trailer body 102 and primary wheels 104 to assist stabilizing trailer 100, as depicted in FIG. 15.

Figure 16:
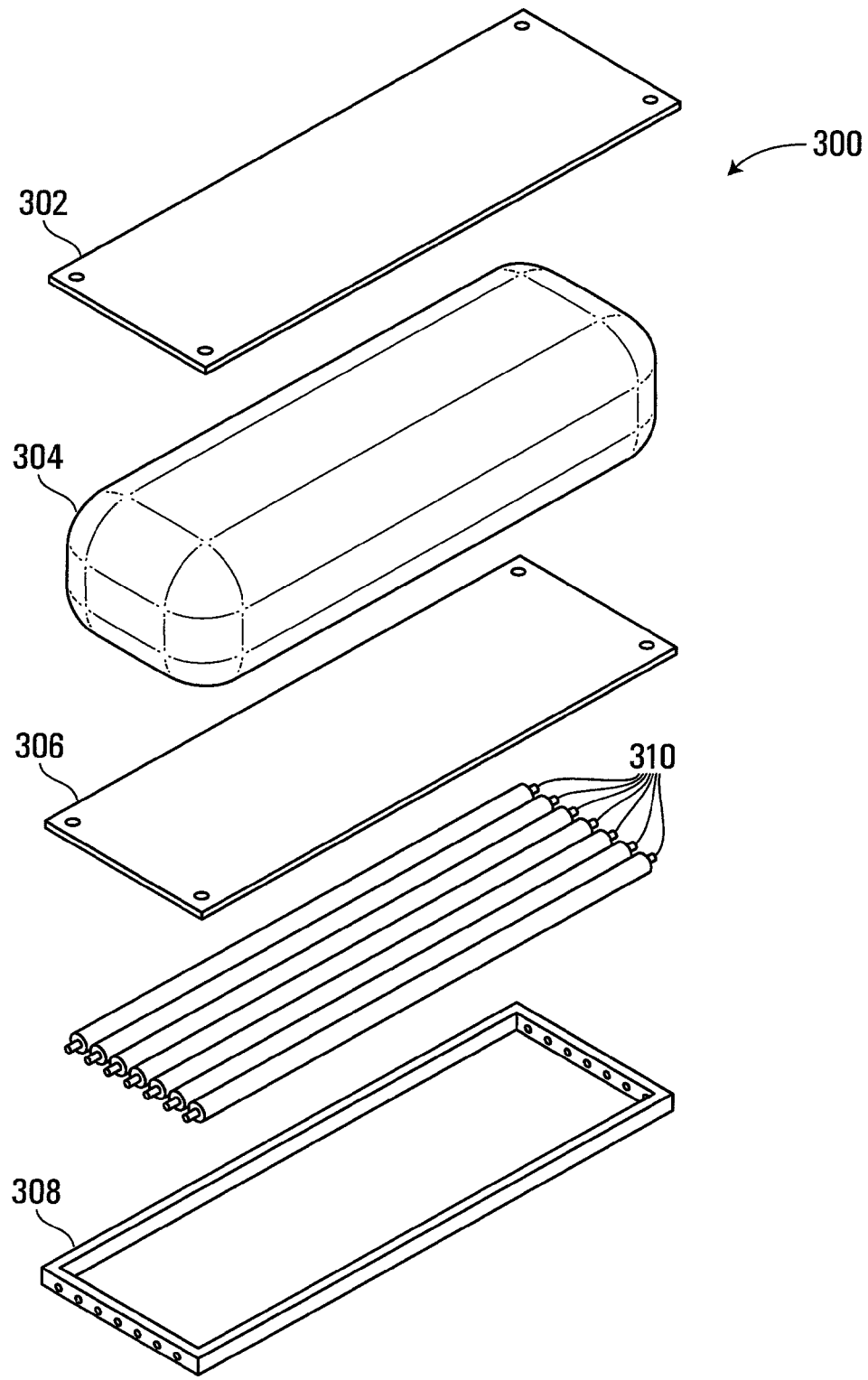
FIG. 16 is an exploded perspective view of the airbag system of FIG. 15.

As shown in FIG. 16, each airbag system 300 includes a top mounting plate 302, an airbag 304, a bottom mounting plate 306, a roller frame 308, and rollers 310 rotatably mounted and supported on the roller frame 308. Top plate 302 is attached to the bottom of trailer body 102 above primary wheels 104, as shown in FIG. 15. The top side of airbag 304 is attached to top plate 302. The bottom side of airbag 304 is attached to bottom plate 306. The roller frame 308 is attached to bottom plate 306.

An air tank or air compressor (not shown) may be connected to airbag 304 for filling air into airbag 304 to expand it. Airbag 304 has one or more valves (not separately shown) connected to the air tank or compressor for filling air into the bag or deleting air from the bag. For example, electrovalves such as pneumatic electrovalves (not shown) may be used for this purpose. When airbag 304 is filled with air, it expends in size (thickness). When airbag 304 is depleted of air, it shrinks in size (thickness).

Airbag 304 is mounted under trailer body 102 above a primary wheel 104 such that when airbag 304 is depleted, rollers 310 are spaced away from primary wheels 104, and when airbag 304 is expanded rollers 310 contact primary wheel 104 to provide addition support for trailer body 102.

During use, airbag 304 is normally in a depleted condition (e.g. as shown in airbag system 300B). When additional support is required on one side of trailer 100 to maintain its balance, the airbag 304 on that side is expanded so that rollers 310 of that airbag 304 come into contact with primary wheels 104 (e.g., as shown in airbag system 300A). Airbag system 300A thus provides additional support for trailer 100, through wheels 104. The air pressure in airbag 304 may be increased or decreased depending on whether a larger or less support force is needed to maintain the balance of trailer 100.

A control system, such as controller 128, may be used to control the operation of airbag systems 300.

As can be appreciated, while multiple rollers 310 in each airbag system are shown in FIG. 16, in some embodiments, a single roller 310 may be provided under each airbag 304.

In addition, an air suspension 400 may be provided to support trailer body 102, as shown in FIG. 15. Air suspension 400 includes at least two air springs 402A and 402B (also collectively or individually referred to as air springs 402). Each air spring 402 is connected to an air supply 404, such as an air tank or air compressor (not shown), to independently supply or withdraw air from the respective air spring 402. Two air springs 402 are positioned one near each side of trailer body 102.

A controller, such as controller 128, may be provided to control the operation of air suspension 400. In particular, air supply 404 can independently supply or withdraw air from each air spring 402, and controller 128 may be configured to control operation of air supply 404 and supply/withdrawal of air from each air spring 402 in response to titling of trailer body 102, or change in load applied on each air spring 402.

In use, when trailer body 102 is balanced, air springs 402 may be filled with air of the same or substantially same pressure. When trailer body 102 is tilted to one side, one of the air springs 402, for example, air spring 402A, may be compressed more by trailer body 102 than the other air spring, e.g. air spring 402B, as a larger load is applied to air spring 402A due to the titling. In such a case, to assist balance of trailer body 102, more air may be supplied to air spring 402A, and some air may be withdrawn from air spring 402B. The desired air pressure in each air spring 402 at the given tilt position may be calculated by controller 128 and applied in the respective air spring 402.

When trailer body 102 regains its balance, air pressures in air springs 402 may be adjusted to be substantially equal again.

The different systems and components described above may be used in combination in one trailer. Alternatively, a trailer may include only one or some of the component systems. For example, the airbag systems 300 and air suspension 400 may be used alone or in combination. One or both of airbag systems 300 and air suspension 400 may be used without the extendable legs 108 in some embodiments. When both airbag systems 300 and air suspension 400 are used, a single compressed air supply such as air supply 404 may be used and operatively connected to supply compressed air to each of airbag systems 300 and air suspension 400.

When a list of items is given herein with an "or" before the last item, any of the listed items or any suitable combination of the listed items may be selected and used. For any list of possible elements or features provided in this specification, any sublist falling within a given list is also intended. Similarly, for any range provided, any subrange falling within a given range is also intended.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A trailer comprising:
   a trailer body;
   a hitch for coupling said trailer to a towing vehicle;
   a primary wheel mounted under said trailer body and in contact with the ground for supporting said trailer and allowing said trailer to be towed;
   an adjustable leg mounted under said trailer body between said hitch and said primary wheel for providing secondary support of said trailer, said leg comprising:
      a terminal end moveable between a retracted position and an extended position, and
      a secondary wheel rotatably attached to said terminal end of said leg such that said secondary wheel is off the ground when said terminal end is in said retracted position and is in contact with the ground when said terminal end is in said extended position;
   a pneumatic or hydraulic drive unit mounted on said trailer body for adjusting said leg to move said terminal end of said leg between said extended and retracted positions;
   a drivetrain mounted on said trailer body and operatively connected to said secondary wheel for driving said secondary wheel;
   a controller for controlling operation of said pneumatic or hydraulic drive unit to automatically adjust said leg to maintain balance of said trailer, and for controlling operation of said drivetrain to drive said trailer when said secondary wheel is in contact with the ground.

2. The trailer of claim 1, wherein said pneumatic or hydraulic drive unit comprises a pneumatic or hydraulic cylinder, and a pneumatic or hydraulic generator for driving said cylinder.

3. The trailer of claim 2, wherein said leg comprises said cylinder and said terminal end of said leg is extendable downwards from said retracted position.

4. The trailer of claim 2, wherein said leg is rotatably attached to said trailer body, and said cylinder is attached to said trailer body and said leg to rotate said leg so as to move said terminal end of said leg between said retracted position and said extended position.

5. The trailer of claim 2, wherein said cylinder is a pneumatic cylinder and said generator comprises a compressor.

6. The trailer of claim 1, comprising a foot mounted at said terminal end of said leg, said foot having a generally flat bottom surface and being movable between a raised position and a lowered position, wherein when said foot is in said raised position said secondary wheel is allowed to contact the ground to support said trailer, and when said foot is in said lowered position said bottom surface of said foot contacts the ground to support said trailer.

7. The trailer of claim 6, wherein said foot comprises a generally U- or L-shaped body.

8. The trailer of claim 6, comprising a locking mechanism for selectively locking said foot in one of said raised and lowered positions.

9. The trailer of claim 1, wherein said controller comprises a sensor for sensing a degree of tilting of said trailer body.

10. The trailer of claim 1, wherein said controller comprises a remote control for operating said controller.

11. The trailer of claim 1, wherein said drivetrain comprises a pneumatic engine.

12. The trailer of claim 11, wherein said drivetrain comprises a chain drive for transmitting a rotational torque from said engine to said secondary wheel.

13. The trailer of claim 1, comprising an airbag mounted under said trailer body above said primary wheel, a roller frame attached to said airbag and a roller rotatably supported on said roller frame, such that when said airbag is depleted said roller is spaced away from said primary wheel, and when said airbag is expanded said roller contacts said primary wheel to provide additional support for said trailer body.

14. The trailer of claim 1, comprising an air suspension, said air suspension comprising at least two air springs, and an air supply connected to each one of said at least two air springs for independently supplying or withdrawing air from said each air spring, and a controller for controlling independent supply and withdrawal of air from said each air spring in response to tilting of said trailer body.

15. The trailer of claim 1, comprising a plurality of primary wheels.

16. The trailer of claim 1, comprising a plurality of adjustable legs and a plurality of secondary wheels each rotatably mounted on a terminal end of one of said legs.

* * * * *